United States Patent
Ahn et al.

(10) Patent No.: US 11,595,903 B2
(45) Date of Patent: Feb. 28, 2023

(54) ELECTRONIC DEVICE SUPPORTING ENDC (EUTRAN (EVOLVED UNIVERSAL TERRESTRIAL RADIO ACCESS NETWORK) NR (NEW RADIO) DUAL CONNECTIVITY) AND A CONTROL METHOD OF THEREOF

(71) Applicant: LG ELECTRONICS INC., Seoul (KR)

(72) Inventors: Hongku Ahn, Seoul (KR); Jaehwan Kim, Seoul (KR); Kibaik Lee, Seoul (KR); Moonkeun Lee, Seoul (KR); Seungjae Lee, Seoul (KR); Seokil Chang, Seoul (KR); Hunsuk Choi, Seoul (KR); Soonjeong Hwang, Seoul (KR); Jongsu Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 17/274,756

(22) PCT Filed: Jun. 21, 2019

(86) PCT No.: PCT/KR2019/007541
§ 371 (c)(1),
(2) Date: Mar. 9, 2021

(87) PCT Pub. No.: WO2020/256196
PCT Pub. Date: Dec. 24, 2020

(65) Prior Publication Data
US 2022/0053426 A1 Feb. 17, 2022

(51) Int. Cl.
*H04W 76/15* (2018.01)
*H04W 52/02* (2009.01)
*H04W 76/16* (2018.01)

(52) U.S. Cl.
CPC ..... *H04W 52/0277* (2013.01); *H04W 52/0264* (2013.01); *H04W 76/16* (2018.02)

(58) Field of Classification Search
CPC ... H04W 8/24; H04W 48/12; H04W 72/0453; H04W 8/22; H04W 76/15; H04W 16/14;
(Continued)

(56) References Cited

U.S. PATENT DOCUMENTS 10,420,161 B1 * 9/2019 Sava ............... H04W 72/085
10,687,287 B2 * 6/2020 Lu ................. H04W 52/346
(Continued)

FOREIGN PATENT DOCUMENTS

KR 10-2013-0056197 5/2013
KR 10-2017-0080596 7/2017
(Continued)

OTHER PUBLICATIONS

PCT International Application No. PCT/KR2019/007541, International Search Report dated Mar. 20, 2020, 6 pages.

*Primary Examiner* — Man U Phan
(74) *Attorney, Agent, or Firm* — Lee, Hong, Degerman, Kang & Waimey PC

(57) ABSTRACT

The present disclosure relates to an electronic device supporting dual connectivity (ENDC) between a 4G network (LTE) and a 5G network (NR), and the electronic device may include a first communication module connected to a 4G base station to perform control and signal processing for transmission and reception of signals through a 4G network; a second communication module connected to a 5G base station to perform control and signal processing for transmission and reception of signals through a 5G network; an application processor (AP) that detects a change of an operation state of the electronic device when the operation state is changed; and a modem that activates only the first
(Continued)

communication module to perform wireless communication with the 4G base station, or further activates the second communication module to perform wireless communication with both the 4G base station and the 5G base station according to the operation state of the electronic device detected by the AP.

13 Claims, 8 Drawing Sheets

(58) Field of Classification Search
CPC ..... H04W 48/20; H04W 72/04; H04W 52/02; H04W 76/16; H04L 1/203; H04L 1/20

USPC .................................................. 370/318, 329
See application file for complete search history.

(56) References Cited

U.S. PATENT DOCUMENTS

| | | | |
|---|---|---|---|
| 11,191,119 B1* | 11/2021 | Sava | H04W 76/15 |
| 11,304,147 B2* | 4/2022 | Yang | H04W 52/146 |
| 11,310,855 B2* | 4/2022 | Hashmi | H04W 76/15 |
| 11,324,060 B2* | 5/2022 | Wang | H04W 76/15 |
| 2019/0069205 A1* | 2/2019 | Lee | H04W 36/00835 |
| 2021/0045174 A1* | 2/2021 | Choi | H04W 72/1263 |
| 2021/0385706 A1* | 12/2021 | Xu | H04W 76/16 |
| 2022/0078682 A1* | 3/2022 | Wang | H04W 76/34 |
| 2022/0110175 A1* | 4/2022 | Marupaduga | H04W 52/365 |
| 2022/0159569 A1* | 5/2022 | Yuan | H04W 76/16 |
| 2022/0183093 A1* | 6/2022 | Sevindik | H04W 76/27 |

FOREIGN PATENT DOCUMENTS

| | | |
|---|---|---|
| KR | 10-2017-0128152 | 11/2017 |
| KR | 10-2018-0068112 | 6/2018 |
| WO | 2018112871 | 6/2018 |

* cited by examiner

FIG. 7
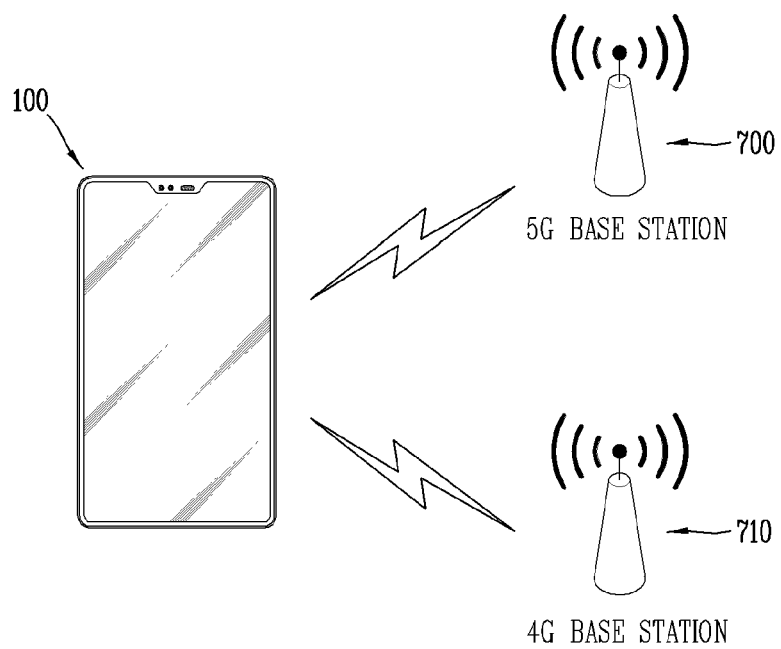
(a)
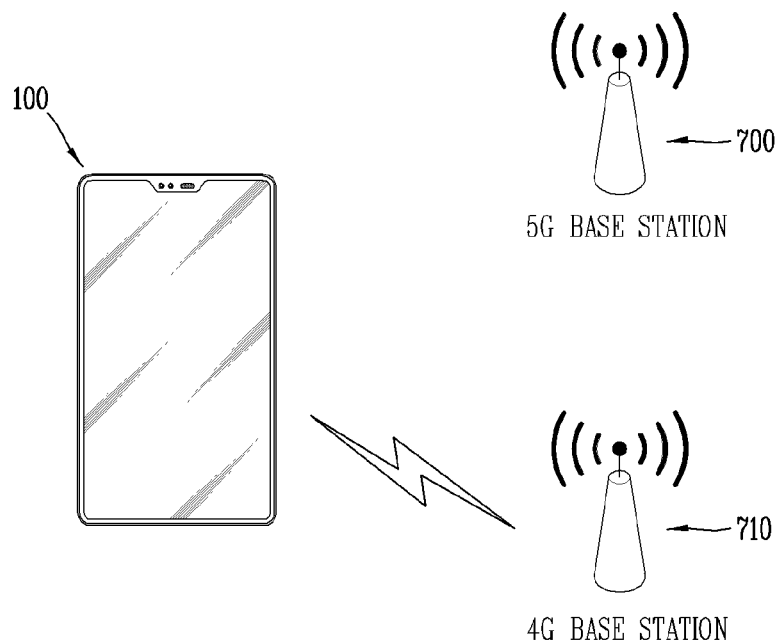
(b)

ELECTRONIC DEVICE SUPPORTING ENDC (EUTRAN (EVOLVED UNIVERSAL TERRESTRIAL RADIO ACCESS NETWORK) NR (NEW RADIO) DUAL CONNECTIVITY) AND A CONTROL METHOD OF THEREOF

CROSS-REFERENCE TO RELATED APPLICATIONS

This application is the National Stage filing under 35 U.S.C. 371 of International Application No. PCT/KR2019/007541, filed on Jun. 21, 2019, the contents of which are hereby incorporated by reference herein its entirety.

BACKGROUND

1. Technical Field

The present disclosure relates to an electronic device supporting dual connectivity (ENDC) between a 4G network (LTE) and a 5G network (NR).

2. Description of the Related Art

In recent years, various electronic devices including mobile terminals may use services through a 4G network and a 5G network using not only LTE (Long Term Evolution, 4G) communication technology but also NR (New Radio, 5G) communication technology.

In the case of an electronic device capable of supporting 4G communication and 5G communication at the same time, it primarily connects to a 4G network, and periodically searches for 5G base stations (cells). Furthermore, when a 5G base station (cell) that satisfies a preset condition is searched, the searched 5G base station may be added (5G cell add) to perform wireless communication with the added 5G base station, thereby allowing the electronic device to be connected to a 4G network and a 5G network at the same time.

In this case, a high-speed wireless communication service may be carried out according to NR communication technology, and stable wireless communication may be carried out according to LTE communication technology. This function that enables connection to 4G and 5G networks at the same time is called ENDC [Evolved Universal Terrestrial Radio Access Network (EUTRAN) New Radio (NR) Dual Connectivity].

Meanwhile, in the case of an electronic device supporting an ENDC function, a process of connecting a 5G network in a place where the 5G network can be connected, and searching for a suitable 5G base station for connection to the 5G network in a place where the 5G network is not connected, and adding the searched 5G base station is carried out for the ENDC function.

However, a bandwidth of 5G communication technology is broadband, which is much wider than that of 4G communication technology. Therefore, a modulation process according to the 5G communication technology is more complex than that of the 4G communication technology, and thus requires more power consumption.

Furthermore, when a 5G base station (cell) suitable for 5G communication is not searched, an electronic device supporting the ENDC function may only be connected to a 4G network, but the process of continuously searching for a suitable 5G base station is performed, and as a result, there is a problem in that the power of the electronic device is consumed.

Meanwhile, the power required for communication with the base station is power consumed even when the electronic device is in a standby state, that is, standby power, and in the case of an electronic device supporting the ENDC function, there is a problem in that the standby power increases due to the ENDC function. In addition, in the case of the ENDC function, even though the required amount of data transmission is small or high-speed data transmission is not required such as text messages, the electronic device is dually connected to a 4G wireless network and a 5G wireless network, and as a result, there is a problem in that power is unnecessarily consumed.

SUMMARY

In order to solve the foregoing and other problems, an aspect of the present disclosure is to provide a control method capable of further reducing the power consumption of an electronic device supporting an ENDC function, and an electronic device consuming less power as well as supporting the ENDC function.

In order to achieve the foregoing and other objectives, according to an aspect of the present disclosure, an electronic device according to an embodiment of the present disclosure may include a first communication module connected to a 4G base station to perform control and signal processing for transmission and reception of signals through a 4G network; a second communication module connected to a 5G base station to perform control and signal processing for transmission and reception of signals through a 5G network; an application processor (AP) that detects a change of an operation state of the electronic device when the operation state is changed; and a modem that activates only the first communication module to perform wireless communication with the 4G base station, or further activates the second communication module to perform wireless communication with both the 4G base station and the 5G base station according to the operation state of the electronic device detected by the AP.

According to an embodiment, the modem may be integrally formed with the first communication module to always maintain the first communication module in an active state, and to activate or deactivate the second communication module according to the operation state of the electronic device detected by the AP.

According to an embodiment, the second communication module may be driven in a low power mode to stop searching for 5G base stations in the vicinity of the electronic device when deactivated.

According to an embodiment, the AP may determine whether the operation state of the electronic device is changed according to an active state of the display module provided in the electronic device, and the modem may activate only the first communication module when the display module is in an inactive state, and activate both the first communication module and the second communication module when the display module is in an active state.

According to an embodiment, the AP may detect an application or service being executed in the electronic device when detecting the operation state of the electronic device, and the modem may activate only the first communication module or activate both the first communication module and the second communication module based on whether a preset application or service is being executed as a result of detecting the application or service being executed.

According to an embodiment, the AP may detect an amount of data transmission required by at least one of an application or service being executed in the electronic device when detecting an operation state of the electronic device, and the modem may activate only the first communication module or activate both the first communication module and the second communication module according to whether the required amount of data transmission is above a preset threshold amount of data transmission.

According to an embodiment, the required amount of data transmission may be an average amount of data transmission calculated based on a user's usage history for each application or service being executed in the electronic device.

According to an embodiment, the AP may generate a first control signal activating only the first communication module or a second control signal activating both the first communication module and the second communication module according to the detected operation state of the electronic device and transmit it to the modem, and the modem may deactivate or activate the second communication module to perform wireless communication only with a 4G base station or perform wireless communication with both the 4G base station and the 5G base station according to the control signal received from the AP.

According to an embodiment, the AP may generate the first control signal when the display module of the electronic device is in an inactive state, and generate the first control signal or the second control signal based on a result of comparing an amount of data transmission required by at least one of an application or service being executed in the electronic device with a preset threshold amount of data transmission when the display module of the electronic device is in an active state.

According to an embodiment, the AP may generate the second control signal when the display module of the electronic device is in an active state, and generate the first control signal or the second control signal based on whether a preset application or service is being executed in the electronic device when the display module of the electronic device is in an inactive state.

According to an embodiment, the modem may detect whether the second communication module is in an idle state when only the first communication module is activated according to the operation state of the electronic device detected by the AP, and maintain the operation state of the second communication module until it is switched to an idle state when the second communication module is not in an idle state, and deactivate the second communication module according to the detected operation state of the electronic device when the second communication module is switched to an idle state.

According to an embodiment, the modem may immediately deactivate the second communication module according to the operation state of the electronic device detected by the AP when the remaining battery level of the electronic device is below a preset level.

In order to achieve the foregoing or other objectives, according to an aspect of the present disclosure, a method of controlling an electronic device may include a first step of detecting an operating state of the electronic device; a second step of determining whether the detected operation state satisfies a preset condition; and a third step of connecting to a 4G base station through a first communication module to transmit and receive data through a 4G network or activating both a first communication module and a second communication module to transmit and receive data through both a 4G network and a 5G network according to the determined result.

According to an embodiment, the preset condition may be at least one of whether the display module of the electronic device is activated, whether a preset application or service is being executed in the electronic device, and whether an amount of data transmission required by an application or service being executed in the electronic device is above a preset threshold amount of data transmission.

According to an embodiment, the first step may be performed when the operation state of the electronic device is changed, and a change in the operation state of the electronic device may include a least one of a change in the operation state of the display module of the electronic device, an end of an application or service being executed in the electronic device, and a case where a new application or service is executed in the electronic device according to a user's request.

The effects of an electronic device according to the present disclosure and a control method of the electronic device will be described as follows.

According to at least one of the embodiments of the present disclosure, the present disclosure may perform simultaneous connection to a 4G network and a 5G network only when a dual connectivity between the 4G network and the 5G network is required based on the detected operation state, thereby having an effect of reducing power consumption due to unnecessary communication connection to the 5G network.

BRIEF DESCRIPTION OF THE DRAWINGS

FIG. 7 is an exemplary view illustrating an example in which an electronic device associated with the present disclosure is switched from a state of being dually connected to a 4G network and a 5G network to a state of being connected only to a 4G network.

DETAILED DESCRIPTION OF THE EMBODIMENTS

Figure 1A:
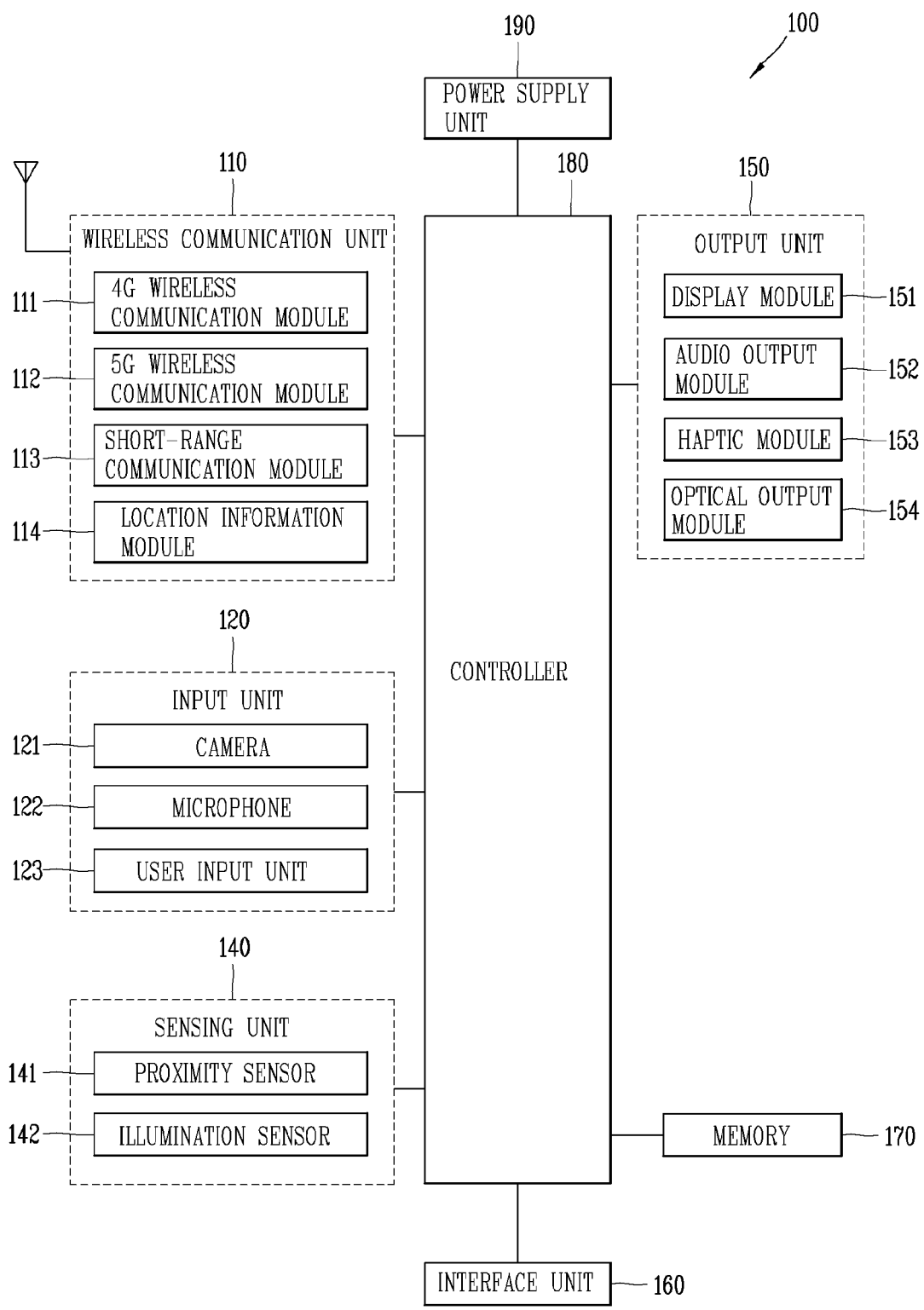
FIG. 1A is a block diagram for explaining an electronic device associated with the present disclosure.

Hereinafter, preferred embodiments of the present disclosure will be described in detail with reference to the accompanying drawings, and the same or similar elements are designated with the same numeral references regardless of the numerals in the drawings and redundant description thereof will be omitted. A suffix "module" and "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Electronic devices described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. However, it may be easily understood by those skilled in the art that the configuration according to the exemplary embodiments of this specification can also be applied to stationary terminals such as digital TV, desktop computers, digital signages, and the like, excluding a case of being applicable only to the electronic devices.

Figure 1B:
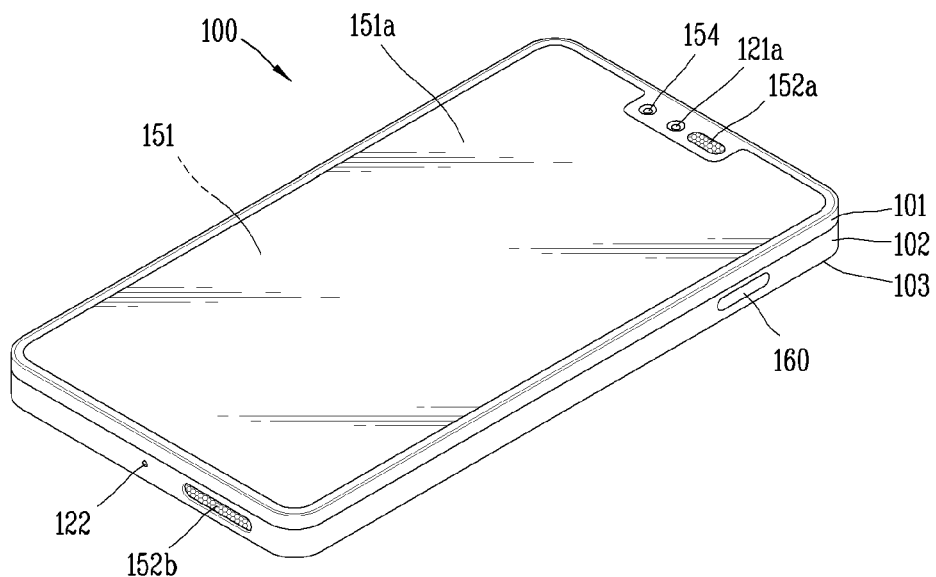
FIGS. 1B and 1C are conceptual views illustrating an example in which an electronic device associated with the present disclosure is seen from different directions.
Figure 1C:
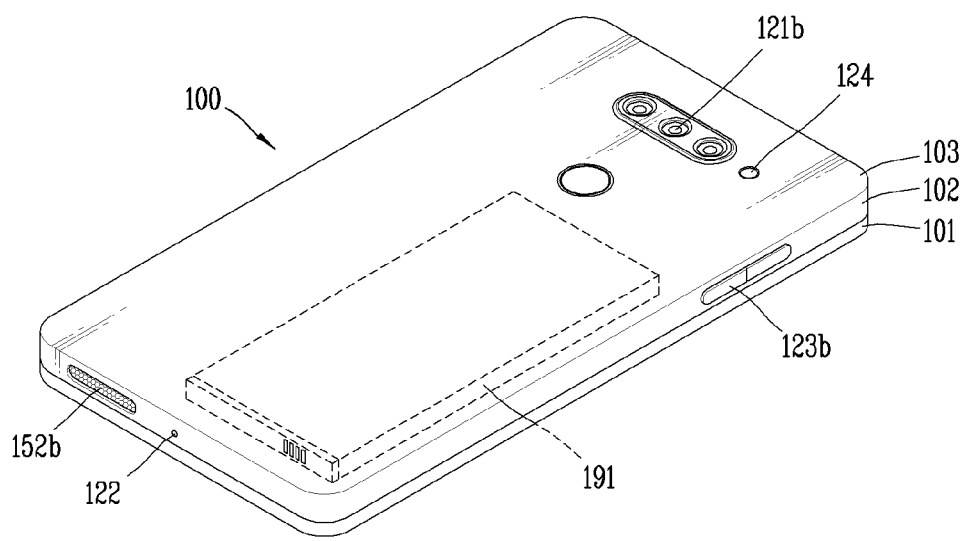

Referring to FIGS. 1A through 1C, FIG. 1A is a block diagram for explaining an electronic device associated with the present disclosure, and FIGS. 1B and 1C are conceptual views illustrating an example in which the electronic device associated with the present disclosure is seen from different directions.

The electronic device 100 may include a wireless communication unit 110, an input unit 120, a sensing unit 140, an output unit 150, an interface unit 160, a memory 170, a controller 180, a power supply unit 190, and the like. FIG. 1A illustrates the electronic device having various components, but it may be understood that implementing all of the illustrated components is not a requirement. Greater or fewer components may alternatively be implemented.

In more detail, the wireless communication unit 110 of those components may typically include one or more modules which permit wireless communications between the electronic device 100 and a wireless communication system, between the electronic device 100 and another electronic device 100, or between the electronic device 100 and an external server. In addition, the wireless communication unit 110 may include one or more modules for connecting the electronic device 100 to one or more networks. Here, the one or more networks may be, for instance, a 4G communication network and a 5G communication network.

The wireless communication unit 110 may include at least one of a 4G wireless communication module 111, a 5G wireless communication module 112, a short-range communication module 113, a location information module 114 and the like.

The 4G wireless communication module 111 may transmit and receive 4G signals to and from 4G base stations through a 4G mobile communication network. At this time, the 4G wireless communication module 111 may transmit one or more 4G transmission signals to the 4G base station. Furthermore, the 4G wireless communication module 111 may receive one or more 4G reception signals from the 4G base station.

In this regard, up-link (UL) multi-input multi-output (MIMO) may be performed by a plurality of 4G transmission signals transmitted to the 4G base station. Furthermore, down-link (DL) multi-input multi-output (MIMO) may be performed by a plurality of 4G reception signals received from the 4G base station.

The 5G wireless communication module 112 may transmit and receive 5G signals to and from 5G base stations through a 5G mobile communication network. Here, the 4G base station and the 5G base station may have a non-stand-alone (NSA) structure. For instance, the 4G base station and the 5G base station may have a co-located structure disposed at the same location within a cell. Alternatively, the 5G base station may be deployed in a stand-alone (SA) structure at a separate location from the 4G base station.

The 5G wireless communication module 112 may transmit and receive 5G signals to and from 5G base stations through a 5G mobile communication network. At this time, the 5G wireless communication module 112 may transmit one or more 5G transmission signals to the 5G base station. Furthermore, the 5G wireless communication module 112 may receive one or more 5G reception signals from the 5G base station.

In this case, a 5G frequency band may use the same band as a 4G frequency band, and it may be referred to as LTE re-farming. On the other hand, for the 5G frequency band, a sub-6 band, which is a band below 6 GHz, may be used.

On the contrary, a millimeter wave (mmWave) band may be used as a 5G frequency band to perform broadband high-speed communication. When the millimeter wave (mmWave) band is used, the electronic device 100 may perform beam forming for communication coverage expansion with a base station.

Meanwhile, regardless of the 5G frequency band, in a 5G communication system, a larger number of multi-input multi-output (MIMO) may be supported to improve transmission speed. In this regard, up-ink (UL) MIMO may be performed by a plurality of 5G transmission signals transmitted to the 5G base station. Furthermore, down-link (DL) MIMO may be performed by a plurality of 5G reception signals received from the 5G base station.

Meanwhile, the wireless communication unit 110 may be in a dual connectivity (DC) state with a 4G base station and a 5G base station through the 4G wireless communication module 111 and the 5G wireless communication module 112. In this way, dual connectivity between the 4G base station and the 5G base station may be referred to as ENDC (EUTRAN NR DC). Here, EUTRAN, which is an Evolved Universal Telecommunication Radio Access Network, denotes a 4G wireless communication system, and NR, which is New Radio, denotes a 5G wireless communication system.

On the other hand, when the 4G base station and the 5G base station have a co-located structure, it is possible to improve throughput through inter-CA (Carrier Aggregation). Therefore, in an EN-DC state with the 4G base station and the 5G base station, 4G reception signals and 5G reception signals may be simultaneously received through the 4G wireless communication module 111 and the 5G wireless communication module 112.

The short-range communication module 113 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 113 may support wireless communications between the electronic device 100 and a wireless communication system, between the electronic device 100 and another electronic device 100, or between the electronic device 100 and a network where another electronic device 100 (or an external server) is located, via wireless area networks. The short-range communication module denotes a module for short-range communications.

Meanwhile, short-range communication between electronic devices may be performed using the 4G wireless communication module 111 and the 5G wireless communication module 112. In an embodiment, short-range communication may be performed between electronic devices using a device-to-device (D2D) scheme without passing through a base station.

Meanwhile, for transmission speed improvement and communication system convergence, carrier aggregation (CA) using at least one of the 4G wireless communication module 111 and 5G wireless communication module 112 and the Wi-Fi communication module 113. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is generally configured to detect, calculate, derive or otherwise identify a position of the electronic device. As an example, the location information module 115 includes a Global Position System (GPS) module, a Wi-Fi module, or both. For example, when the electronic device uses the GPS module, a position of the electronic device may be acquired using a signal sent from a GPS satellite. As another example, when the electronic device uses the Wi-Fi module, a position of the electronic device may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the electronic device. As a module used to acquire the location (or current location) of the electronic device, the location information module 115 may not be necessarily limited to a module for directly calculating or acquiring the location of the electronic device.

Specifically, when the 5G wireless communication module 112 is used by the electronic device, the location of the electronic device may be obtained based on the information of the 5G base station transmitting and receiving a wireless signal to and from the 5G wireless communication module. In particular, since the 5G base station in a mmWave band is deployed in a small cell having a narrow coverage, it is advantageous to obtain the location of the electronic device.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of information within the electronic device, surrounding environment information of the electronic device, and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the electronic device disclosed herein may utilize information in such a manner of combining information sensed by at least two sensors of those sensors.

The output unit 150 may be configured to output an audio signal, a video signal or a tactile signal. The output unit 150 may include a display module 151, an audio output module 152, a haptic module 153, an optical output unit 154 and the like. The display module 151 may have an inter-layered structure or an integrated structure with a touch sensor in order to implement a touch screen. The touch screen may provide an output interface between the electronic device 100 and a user, as well as functioning as the user input unit 123 which provides an input interface between the electronic device 100 and the user.

The interface unit 160 serves as an interface with various types of external devices that can be coupled to the electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The electronic device 100 may execute an appropriate control related to a connected external device, in response to the external device being connected to the interface unit 160.

In addition, the memory 170 stores data supporting various functions of the electronic device 100. The memory 170 is typically implemented to store data to support various functions or features of the electronic device 100. For instance, the memory 170 may be configured to store application programs executed in the electronic device 100, data or instructions for operations of the electronic device 100, and the like. At least some of those application programs may be downloaded from an external server via wireless communication. Some others of those application programs may be installed within the electronic device 100 at the time of being shipped for basic functions of the electronic device 100 (for example, receiving a call, placing a call, receiving a message, sending a message, etc.). On the other hand, the application programs may be stored in the memory 170, installed in the electronic device 100, and executed by the controller 180 to perform an operation (or a function) of the electronic device 100.

The controller 180 may typically control an overall operation of the electronic device 100 in addition to the operations related to the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may combine at least two of the components included in the electronic device 100 to execute the application program.

Hereinafter, the controller 180 that controls an overall operation of the electronic device will be referred to as the terminal controller 180.

The power supply unit 190 may receive external power or internal power and supply appropriate power required for operating respective elements and components included in the electronic device 100 under the control of the terminal controller 180. The power supply unit 190 may include a battery, and the battery may be an embedded battery or a replaceable battery. Hereinafter, the power supply unit 190 that supplies power to each of the components included in the electronic device 100 will be referred to as a terminal power supply unit 190.

At least part of those elements and components may be combined to implement operation and control of the electronic device or a control method of the electronic device according to various exemplary embodiments described herein. Furthermore, the operation and control or the control method of the electronic device may be implemented in the electronic device by executing at least one application program stored in the memory 170.

Referring to FIGS. 1B and 1C, the electronic device 100 disclosed herein has a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of electronic device or on a specific type of electronic device will be also typically applied to another type of electronic device.

Here, the terminal body may be understood as a conception which indicates the electronic device 100 as at least one assembly.

The electronic device 100 may include a case (for example, a frame, a housing, a cover, etc.) constituting the appearance thereof. As illustrated in the drawing, the electronic device 100 may include a front case 101 and a rear case 102. Various electronic components may be incorporated into a space formed between the front case 101 and the rear case 102. At least one middle case may be additionally disposed between the front case 101 and the rear case 102

A display module 151 may be disposed on a front surface of the terminal body to output information. As illustrated, a window 151a of the display module 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The electronic device 100 may include a display module 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

The display module 151 may display (output) information processed in the electronic device 100. For example, the display module 151 may display execution screen information of an application program executed in the electronic device 100 or user interface (UI) and graphic user interface (GUI) information in response to the execution screen information.

The display module 151 may be implemented in two or more in number according to a configured aspect of the electronic device 100. For instance, a plurality of the display units 151 may be arranged on one surface to be spaced apart from or integrated with each other, or may be arranged on different surfaces.

The display module 151 may include a touch sensor which senses a touch onto the display module 151 so as to receive a control command in a touching manner. When a touch is made on the display module 151, the touch sensor may be configured to sense this touch and the terminal controller 180 may generate a control command corresponding to the touch. The content which is input in the touching manner may be a text or numerical value, or a menu item which can be indicated or designated in various modes.

In this manner, the display module 151 may form a flexible touch screen along with the touch sensor, and in this case, the touch screen may function as the user input unit 123 (refer to FIG. 1A). Therefore, the touch screen may replace at least part of the functions of the first manipulation unit 123a.

The first audio output module 152a may be implemented as a receiver for transferring voice sounds to the user's ear and the second audio output module 152b may be implemented in the form of a loud speaker for outputting various alarm sounds or multimedia reproduction sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the terminal controller 180 may control the optical output unit 154 to end the output of light.

The first camera 121a may process video frames such as still or moving images acquired by the image sensor in a video call mode or a capture mode. The processed video frames may be displayed on the display unit 151, and stored in the memory 170.

The first and second manipulation units 123a and 123b are examples of the user input unit 123, which may be manipulated by a user to input a command for controlling the operation of the electronic device 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

On the other hand, the electronic device 100 may include a fingerprint recognition sensor for recognizing a user's fingerprint, and the terminal controller 180 may use fingerprint information sensed through the finger recognition sensor as an authentication means. The finger scan sensor may be installed in the display module 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the electronic device 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an "array camera." When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or implemented on the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

A terminal power supply unit 190 (refer to FIG. 1A) for supplying power to the electronic device 100 may be disposed on the terminal body. The terminal power supply unit 190 may be incorporated into the terminal body, or may include a battery 191 configured in a detachable manner on the outside of the terminal body.

Hereinafter, a multi-transmission system structure and an electronic device including the same according to the present disclosure, particularly embodiments related to a power amplifier and an electronic device including the same in a heterogeneous radio system, will be described with reference to the accompanying drawings. It should be understood by those skilled in the art that the present disclosure can be embodied in other specific forms without departing from the concept and essential characteristics thereof.

Figure 2:
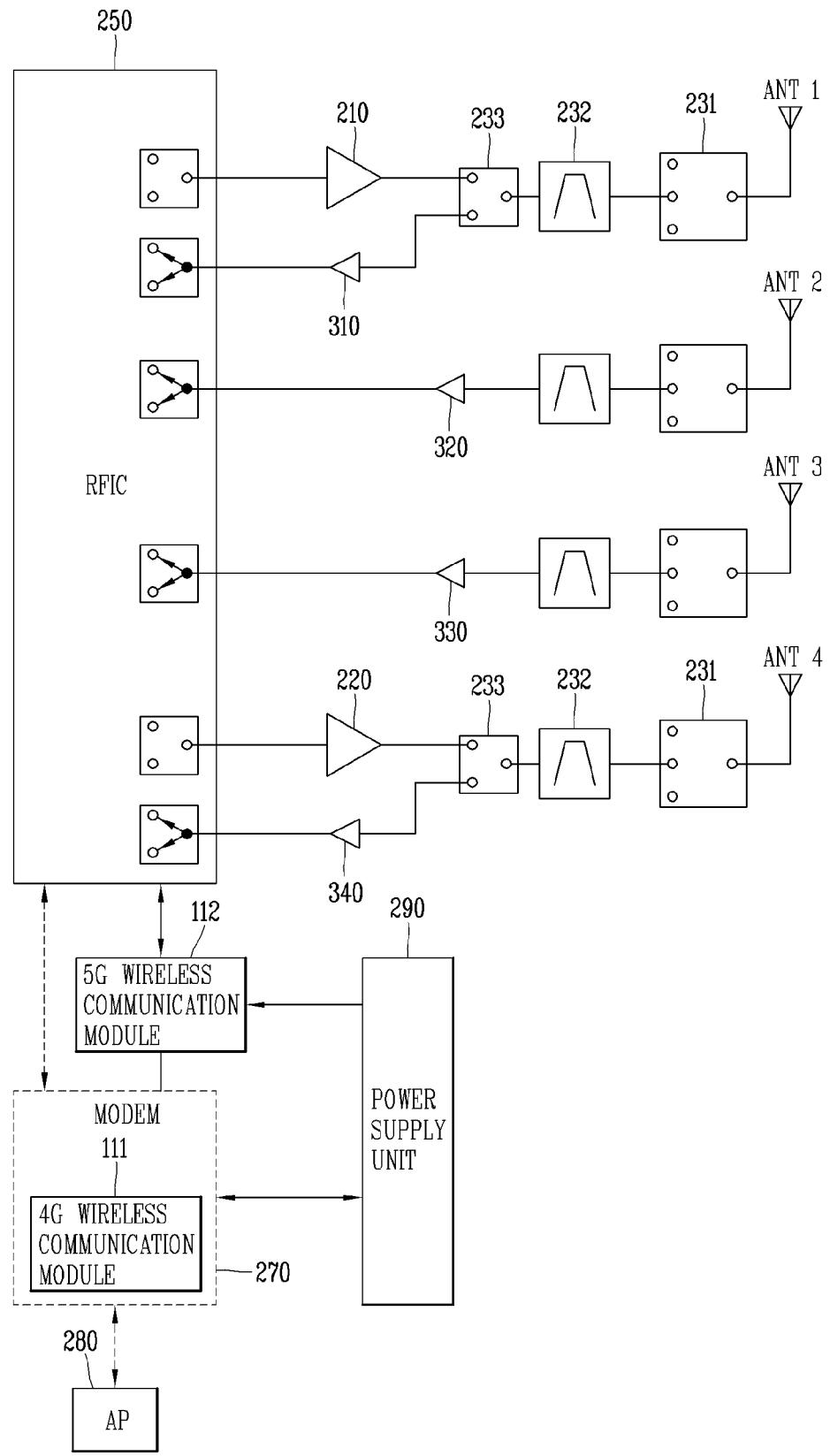
FIG. 2 is a block diagram illustrating a configuration of a wireless communication unit of an electronic device operable in a plurality of wireless communication systems according to an embodiment of the present disclosure.

FIG. 2 illustrates a configuration of a wireless communication unit in an electronic device operable in a plurality of wireless communication systems according to the present disclosure. Referring to FIG. 2, the electronic device includes a first power amplifier 210, a second power amplifier 220, and an RFIC 250. In addition, the electronic device may further include a modem 270, an application processor 280, and a power supply unit 290.

Meanwhile, the modem 270 may be physically implemented on a single chip with at least one of the 4G wireless communication module 111 and the 5G wireless communication module 112. When the 4G wireless communication module 111 and the 5G wireless communication module 112 are implemented as a single modem (an integrated modem), the integrated modem may perform both modulation/demodulation for transmitting and receiving 5G signals and modulation/demodulation for transmitting and receiving 4G signals.

Alternatively, the modem 270 may be implemented integrally with either one (the first communication module) of the 4G wireless communication module 111 and the 5G wireless communication module 112. In this case, the other wireless communication module (the second communication module) may be implemented in the form of a chip physically separated from the modem. In this case, the modem may basically perform modulation and demodulation according to a wireless communication scheme according to the first communication module, and may be connected to the second communication module as needed. In this case, the second communication module may perform modulation and demodulation in a wireless communication scheme different from the modem, and accordingly, may perform wireless communication with both the 4G base station and the 5G base station to be simultaneously connected (ENDC) to the 4G wireless network and the 5G wireless network.

Meanwhile, in the following description, for convenience of explanation, a case where the modem 270 is implemented integrally with the 4G wireless communication module 111 will be described as an example. In this case, the 5G wireless communication module 112 may be implemented in the form of a chip physically separated from the modem 270. In this case, the modem 270 may basically provide a 4G wireless network service through the integrated 4G wireless communication module 111, and when an ENDC function is activated, the modem 270 may be connected to the 5G wireless communication module 112 to provide a 5G wireless communication module to simultaneously provide a 5G wireless network service through the 5G wireless communication module 112.

Meanwhile, the power supply unit 290 may be connected to the modem 270 and the 5G wireless communication module 112. In addition, the power supply unit 290 may supply power required for driving the modem 270 and the 5G wireless communication module 112. The power supply unit 290 may be a battery of the electronic device 100 and may be a power management integrated circuit (PMIC) that supplies power supplied from the battery to each component.

Here, the modem 270 and the application processor (AP) 280 may be physically implemented on a single chip, and may be implemented in a logical and functionally separated form. However, the present disclosure is not limited thereto and may be implemented in the form of a chip that is physically separated according to an application.

Meanwhile, the electronic device 100 includes a plurality of low-noise amplifiers (LNAs) 261 to 264 in the receiver. Here, the first power amplifier 210, the second power amplifier 220, the RFIC 250, and the plurality of low-noise amplifiers 261 to 264 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but is not limited thereto, and may also be configured as a 4G/5G separation type according to an application. When the RFIC 250 is configured as a 4G/5G integrated type, it is advantageous in terms of synchronization between 4G/5G circuits, and also there is an advantage capable of simplifying control signaling by the modem 270.

On the other hand, when the RFIC 250 is configured as a 4G/5G separation type, it may be referred to as a 4G RFIC and a 5G RFIC, respectively. In particular, when a band difference between the 5G band and the 4G band is large, such as when the 5G band is configured as a millimeter wave band, the RFIC 250 may be configured as a 4G/5G separation type. As such, when the RFIC 250 is configured as a 4G/5G separation type, there is an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 280 is configured to control the operation of each component of the electronic device. Specifically, the application processor (AP) 280 may control the operation of each component of the electronic device through the modem 270.

For example, the application processor (AP) 280 may control the modem 270 through a power management IC (PMIC) for low power operation of the electronic device. Accordingly, the modem 270 may operate the power circuits of the transmitter and the receiver in a low power mode through the RFIC 250.

In this regard, when it is determined that the electronic device 100 is in an idle mode, the application processor (AP) 280 may control the RFIC 250 through the modem 270 as follows. For example, when the electronic device is in an idle mode, the RFIC 250 may be controlled through the modem 270 such that at least one of the first and second power amplifiers 210, 220 operates in a low power mode or is off.

According to another embodiment, the application processor (AP) 280 may control the modem 270 to provide wireless communication capable of performing low power communication when the electronic device is in a low power mode. For example, when the electronic device is connected to a plurality of entities among a 4G base station, a 5G base station, and an access point, the application processor (AP) 280 may control the modem 270 to enable wireless communication at the lowest power. Accordingly, the application processor (AP) 280 may control the modem 270 and the RFIC 250 to perform short-range communication using only the short-range communication module 113, even at the expense of throughput.

According to another embodiment, when the remaining battery level of the electronic device is above the threshold, the modem 270 may be controlled to select an optimal wireless interface. For example, the application processor (AP) 280 may control the modem 270 to receive data through both the 4G base station and the 5G base station according to the remaining battery level and the available radio resource information. In this case, the application processor (AP) 280 may receive the remaining battery information from the PMIC, and the available radio resource information from the modem 270. Accordingly, when the remaining battery level and the available radio resources are sufficient, the application processor (AP) 280 may control the modem 270 and the RFIC 250 to receive data through both the 4G base station and 5G base station.

Meanwhile, a multi-transceiving system of FIG. 2 may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 2 may control other communication systems as needed, thereby minimizing system delay due to this, and thus there is an advantage in that efficient resource allocation is possible.

Meanwhile, the first power amplifier 210 and the second power amplifier 220 may operate in at least one of the first and second communication systems. In this regard, when the 5G communication system operates in a 4G band or a sub-6 band, the first and second power amplifiers 210 and 220 may operate in both the first and second communication systems.

On the contrary, when the 5G communication system operates in a millimeter wave (mmWave) band, the first and second power amplifiers 210, 220 may operate in either the 4G band and the other in the millimeter wave band.

On the other hand, a transmitter and a receiver may be integrated to implement two different wireless communication systems using a single antenna using a dual transmit/ receive antenna. Here, 4×4 MIMO may be implemented using four antennas as shown in FIG. 2. In this case, 4×4 DL MIMO may be performed through downlink (DL).

Meanwhile, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is a millimeter wave (mmWave) band, a plurality of antennas may be individually configured as an array antenna in the millimeter wave band.

Meanwhile, 2×2 MIMO may be implemented using two antennas connected to the first power amplifier 210 and the second power amplifier 220 among four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 210, 220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is integrated into the RFIC corresponding to the RFIC 250, and an additional component does not need to be disposed externally, thereby improving component mountability. Specifically, the transmitters (TXs) of two different communication systems may be selected using a single-pole double-throw (SPDT) type switch in the RFIC corresponding to the controller 250.

In addition, the electronic device that is operable in the plurality of wireless communication systems according to the present disclosure may further include a duplexer (231), a filter 232 and a switch 233.

The duplexer 231 is configured to separate signals in a transmission band and a reception band from each other. In this case, signals in a transmission band transmitted through the first and second power amplifiers 210, 220 may be applicable to the antennas (ANT1, ANT4) through a first output port of the duplexer 231. On the contrary, a signal in a reception band received through the antennas (ANT1, ANT4) may be received by the low-noise amplifiers 261, 264 through a second output port of the duplexer 231.

The filter 232 may be configured to pass signals in a transmission band or a reception band and block signals in the remaining bands. In this case, the filter 232 may include a transmission filter connected to the first output port of the duplexer 231 and a reception filter connected to the second output port of the duplexer 231. Alternatively, the filter 232 may be configured to pass only signals in the transmission band or only signals in the reception band according to a control signal.

The switch 233 is configured to transmit only one of the transmission signal and the reception signal. In an embodiment of the present disclosure, the switch 233 may be configured in a single-pole double-throw (SPDT) type to separate a transmission signal and a reception signal in a time division duplex (TDD) scheme. Here, the transmission signal and the reception signal are signals of the same frequency band, and thus the duplexer 231 may be implemented in the form of a circulator.

Meanwhile, in another embodiment of the present disclosure, the switch 233 may also be applicable to a frequency division duplex (FDD) scheme. In this case, the switch 233 may be configured in the form of a double-pole double-throw (DPDT) to connect or block a transmission signal and a reception signal, respectively. On the other hand, the transmission signal and the reception signal may be separated by the duplexer 231, and thus the switch 233 is not necessarily required.

Meanwhile, the electronic device according to the present disclosure may further include a modem 270 corresponding to the controller. In this case, the RFIC 250 and the modem 270 may be referred to as a first controller (or a first processor) and a second controller (a second processor), respectively. On the other hand, the RFIC 250 and the modem 270 may be implemented as physically separated circuits. Alternatively, the RFIC 250 and the modem 270 may be logically or functionally divided into a single circuit.

The modem 270 may perform control and signal processing for the transmission and reception of signals through different communication systems through the RFIC 250. The modem 270 may be acquired through control information received from the 4G base station and/or the 5G base station. Here, the control information may be received through a physical downlink control channel (PDCCH), but the present disclosure is not limited thereto.

The modem 270 may control the RFIC 250 to transmit and/or receive signals through the first communication system and/or the second communication system at specific time and frequency resources. Accordingly, the RFIC 250 may control transmission circuits including the first and second power amplifiers 210, 220 to transmit 4G or 5G signals in a specific time interval. In addition, the RFIC 250 may control reception circuits including first through fourth low-noise amplifiers 261 to 264 to receive 4G or 5G signals in a specific time interval.

Figure 3:
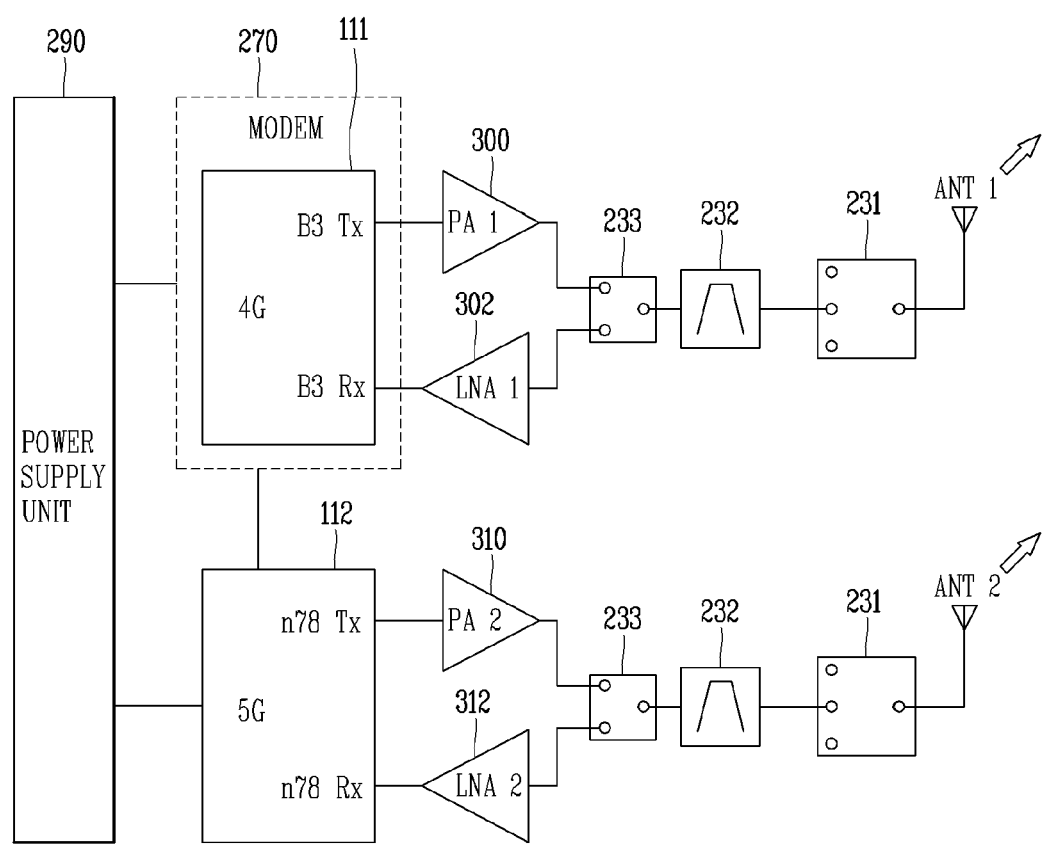
FIG. 3 is a block diagram illustrating in more detail each wireless communication module in the wireless communication unit illustrated in FIG. 2.

Meanwhile, FIG. 3 is a block diagram showing in more detail each wireless communication module of the wireless communication unit shown in FIG. 2.

The wireless communication unit of the electronic device 100 according to an embodiment of the present disclosure may include two or more power amplifiers as shown in 2T4R in FIG. 2. However, for simplicity of explanation, it will be described on the assumption that multiplex transmission is performed when two power amplifiers are provided as shown in FIG. 3. However, the present disclosure is not limited to such a structure, and may, of course, have more power amplifiers or a greater number of communication systems depending on its application.

Referring to FIG. 3, the wireless communication unit of the electronic device 100 includes a first power amplifier 300, a first low-noise amplifier 302, a second power amplifier 310, a second low-noise amplifier 312, a modem 270, a 5G wireless communication module 112 and a power supply unit 290.

Here, the modem 270 may include a 4G wireless communication module 111 operating in a 4G communication system. Furthermore, the 5G wireless communication module 112 and the modem 270 capable of operating in a 5G communication system may be physically separated or may be physically implemented in a structure that is functionally separated in a single chip. However, the present disclosure is not limited thereto, and the modem 270 may be implemented as an integrated type including the 4G wireless communication module 111 and the 5G wireless communication module 112.

In addition, the first power amplifier 300 and the first low-noise amplifier 302 may operate in a first communication system, and the second power amplifier 310 and the second low-noise amplifier 312 may operate in a second communication system. In this case, the first and second communication systems may be a 4G communication system and a 5G communication system, respectively, but are not limited thereto.

Meanwhile, the modem 270 and the 5G wireless communication module 112 may be electrically connected. Furthermore, the 5G wireless communication module 112 may perform modulation/demodulation for transmission or reception of 5G signals under the control of the modem 270. In this case, the modem 270 may control the operation state (e.g., activation or deactivation) of the 5G wireless communication module 112.

For example, the modem 270 may control the 5G wireless communication module 112 to receive data through both the 4G base station and the 5G base station according to an operation state detection result of the electronic device 100 detected from the application processor (AP) 280. In this case, the modem 270 may activate the 5G wireless communication module 112, and the activated 5G wireless communication module 112 may search for a 5G base station (cell) satisfying a preset condition from the vicinity of the electronic device 100, and add the searched 5G base station (5G Cell ADD) and perform wireless communication to provide a service through a 5G network. In this case, the electronic device 100 may operate in a non-stand-alone (NSA) mode that is connected (ENDC) to both a 4G network and a 5G network.

On the other hand, the modem 270 may deactivate the 5G wireless communication module 112 according to a result of detecting the operation state of the electronic device 100. In this case, the modem 270 may operate the 5G wireless communication module 112 in a low power mode.

Meanwhile, the 5G wireless communication module 112 switched to the low power mode may not search for the 5G base station. Then, the addition of a 5G base station (5G Cell ADD) and wireless communication with the searched 5G base station may not be performed, and as a result, the electronic device 100 may operate in a state of performing wireless communication only with a 4G base station, that is, in a stand-alone (SA) mode that is connected only to a 4G network.

Meanwhile, the power supply unit 290 may supply power required for driving the modem 270 and the 5G wireless communication module 112. Here, the power supply unit 290 may control current supplied to the 5G wireless communication module 112 under the control of the modem 270. In this case, the modem 270 may control the power supply unit 290 in such a manner that current below a preset threshold is supplied to the 5G wireless communication module 112, thereby deactivating the 5G wireless communication module 112.

For an example, the 5G wireless communication module 112 may operate in a normal operation mode when the current supplied from the power supply unit 290 is above a preset threshold value. Then, the 5G wireless communication module 112 may search for a 5G base station (cell), and add the searched 5G base station (5G Cell ADD), and perform wireless communication. Accordingly, the electronic device 100 may operate in anon-stand-alone (NSA) mode that is connected (ENDC) to both a 4G network and a 5G network.

On the other hand, the 5G wireless communication module 112 may operate in a low power mode when current supplied from the power supply unit 290 is below a preset threshold value. Then, the 5G wireless communication module 112 may stop searching for a 5G base station (cell). Accordingly, the electronic device 100 may operate in a state in which wireless communication is performed only with a 4G base station, that is, a stand-alone (SA) mode that is connected only to a 4G network.

Meanwhile, in the following description, a specific operation and function of the electronic device according to the present disclosure including the multi-transceiving system as shown in FIGS. 2 and 3 will be described.

Figure 4:
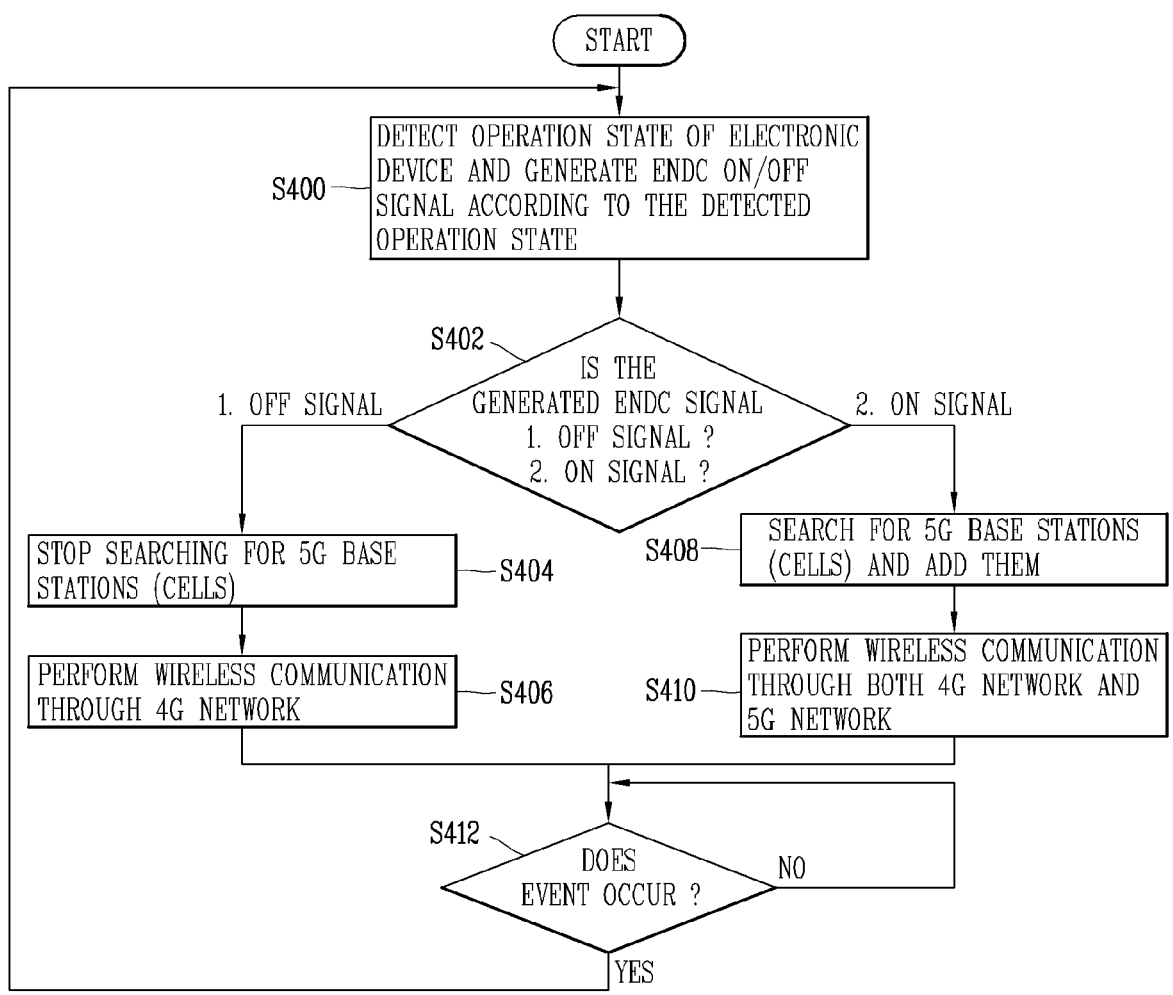
FIG. 4 is a flowchart illustrating an operation process of performing dual connectivity to a 4G network and a 5G network according to a detected operation state in an electronic device associated with the present disclosure.

FIG. 4 is a flowchart illustrating an operation process of a wireless communication unit dually connected to a 4G network and a 5G network or connected only to a 4G network according to a detected operation state in the electronic device 100 associated with the present disclosure.

First, when the operation state of the electronic device 100 is changed, the electronic device 100 according to an embodiment of the present disclosure may determine it as an occurrence of an event. For example, the application processor (AP) 280 may detect whether an event has occurred in the electronic device 100. Here, the event may denote that the operation state of the electronic device 100 is changed. Furthermore, a change in the operating state of the electronic device 100 may be a case where an application or program being executed in the electronic device 100 is added or a case where the application or program currently being executed is ended. Alternatively, it may denote that the operation state of a specific component constituting the electronic device 100 is changed.

Accordingly, when a user input for executing a specific application or program is applied, and the specific application or program is executed according to the applied input of the user, the AP 280 may determine that an event has occurred. In addition, when the application or program currently being executed is ended, the AP 280 may determine that an event has occurred in the electronic device 100. Furthermore, when the display module 151 is switched to an active or inactive state, the AP 280 may determine that an event has occurred in the electronic device 100.

When it is determined that an event has occurred as described above, the AP 280 may first detect the changed operating state of the electronic device 100. In addition, a signal for controlling an ENDC function may be generated according to the detected operation state (S400).

In step S400, first, the AP 280 may detect a changed operation state, that is, an application or program that is requested to be executed or has been additionally executed. Alternatively, an operation state of a component whose operation state has changed may be detected. Accordingly, the AP 280 may detect a newly executed application or program according to a user input or may detect an application or program that has been executed. Furthermore, when the operation state of the display module 151 is changed, it may be detected whether the display module 151 is in an active state or an inactive state.

In addition, the AP 280 may generate a signal for controlling the ENDC function based on the detected operation state. Furthermore, the generated ENDC control signal may be transmitted to the modem 270.

Here, the ENDC function may denote a function of being dually connected to a 4G base station and a 5G base station as described above to provide a 4G communication service and a 5G communication service at the same time. Furthermore, the ENDC control signal may be a control signal for activating or deactivating the ENDC function. In the following description, an ENDC control signal for activating the ENDC function will be referred to as an "ENDC ON signal", and an ENDC control signal for deactivating the ENDC function will be referred to as an "ENDC OFF signal".

Meanwhile, the AP 280 may generate an ENDC ON signal or an ENDC OFF signal according to a currently detected operation state of the electronic device 100. For example, the AP 280 may generate an ENDC ON signal when the detected operation state of the electronic device 100 satisfies a preset condition. On the other hand, when the preset condition is not satisfied, the AP 280 may generate an ENDC OFF signal.

For an example, when the detected operation state of the display module 151 is an active state, the AP 280 may determine that a preset condition is satisfied. On the contrary, when the detected operation state of the display module 151 is an inactive state, it may be determined that a preset condition is not satisfied.

Alternatively, when an application or program that is newly requested to be executed, or at least one of applications or programs currently being executed in the electronic device 100 is a preset application or program, it may be determined that the preset condition is satisfied. Here, the preset application or program may be related to tethering or uploading or downloading data.

Alternatively, when an amount of data transmission required by an application or program that is newly requested to be executed or applications or programs currently being executed in the electronic device 100 is above a preset threshold value, it may be determined that the preset condition is satisfied.

In other words, when an application or program that is expected to transmit a large amount of data, or an application or program that requires a transmission amount of data above a threshold value is executed, the AP 280 may determine that a preset condition for activating the ENDC function is satisfied.

In addition, the AP 280 may generate an ENDC ON signal when it is determined that the detected operation state of the electronic device 100 satisfies a preset operation state, and may generate an ENDC OFF signal when it is determined that the detected operation state does not satisfy the preset operation state. Furthermore, the generated ENDC control signal may be transmitted to the modem 270.

Accordingly, when the display module 151 is in an active state, or when an amount of data transmission required by an application or program requested to be executed or currently being executed is above a threshold value or when a preset application or program is being executed in the electronic device 100 as a result of detecting the operation state of the electronic device 100, the AP 280 may transmit an ENDC ON signal to the modem 270. On the contrary, when the display module 151 is in an inactive state, or when an amount of data transmission required by an application or program requested to be executed or currently being executed is below a threshold value or when a preset application or program is not being executed in the electronic device 100, the AP 280 may transmit an ENDC ON signal to the modem 270.

Meanwhile, the modem 270 may activate or deactivate the ENDC function according to the ENDC control signal transmitted from the AP 280 (S402).

In other words, when the ENDC control signal received from the AP 280 is an ENDC OFF signal, the modem 270 may control the 5G wireless communication module 112 to stop searching for a 5G base station (cell) (S404). In this case, the modem 270 may allow the 5G wireless communication module 112 to operate in a low power mode, and accordingly, the 5G wireless communication module 112 may stop searching for a 5G base station.

Meanwhile, as described above, the modem 270 may be implemented integrally with the 4G wireless communication module 111. Accordingly, the modem 270 may be basically implemented to perform wireless communication in a 4G communication mode. Therefore, when the ENDC OFF signal is received from the AP 280, the modem 270 may be connected only to a 4G base station, and thus, may only provide a wireless communication service through a 4G network (S406).

On the contrary, when the ENDC control signal received from the AP 280 is an ENDC OFF signal, the modem 270 may control the 5G wireless communication module 112 to search for a 5G base station (cell) in the vicinity of the electronic device 100. Furthermore, the modem 270 may add the searched 5G base station (5G Cell Add) to perform wireless connection (S408). Therefore, when the ENDC ON signal is received from the AP 280, the modem 270 may be connected to not only the 4G base station but also the 5G base station, thereby providing a wireless communication service according to dual connectivity between the 4G network and the 5G network (S410).

Accordingly, when an application or program that is expected to transmit a large amount of data or an application or program that requires a transmission amount of data above a threshold value is executed, the electronic device 100 according to an embodiment of the present disclosure may provide stable and high-speed data communication through dual connectivity (ENDC) between the 4G network and the 5G network. On the contrary, when an application or program with a small amount of data transmission is executed, the electronic device 100 may be connected only to the 4G network to reduce power loss due to connection to the 5G network.

Meanwhile, the step S404 of operating the 5G wireless communication module 112 in a low power mode according to the ENDC OFF signal may further include a process of detecting the operation state of the 5G wireless communication module 112. In this case, the modem 270 may detect whether the 5G wireless communication module 112 is in an idle state, and switch the 5G wireless communication module 112 to a low power mode when the 5G wireless communication module 112 is in an idle state. This is to prevent the 5G wireless communication module 112 from being switched to a low power mode while transmitting or receiving data.

Meanwhile, the modem 270 may omit the process of detecting whether the 5G wireless communication module 112 is in an idle state according to the remaining battery level of the electronic device 100. For an example, the modem 270 may receive information on the remaining battery level from the power supply unit 290 (e.g., PMIC), and may omit the process of detecting whether the 5G wireless communication module 112 is in an idle state when the remaining battery level is below a preset value. In this case, even when the 5G wireless communication module 112 is in a state of transmitting or receiving data, the 5G wireless communication module 112 may be switched to a low power mode.

On the other hand, while providing only a wireless communication service through a 4G network or providing a wireless communication service according to dual connectivity between a 4G network and a 5G network in the step S406 or S410, the AP 280 may determine again whether an event has occurred (S412).

In step S412, when the operation state of the electronic device 100 is changed, the AP 280 may determine that an event has occurred. For example, when an application or program being executed is added, or when the application or program currently being executed is ended, or when the operation state of a specific component (e.g., display module 151) constituting the electronic device 100 is changed, the AP 280 may determine that an event has occurred. Furthermore, when it is determined that an event has occurred, the process may proceed to step S400 again, and perform again the foregoing processes of FIG. 4. On the contrary, when an event has not occurred, the AP 280 may maintain a state of providing only a wireless communication service through a 4G network (step S406), or a state of providing a wireless communication service according to dual connectivity between a 4G network and a 5G network (step S410).

Meanwhile, in the foregoing description, it is shown as an example that the ENDC ON signal or the ENDC OFF signal is generated depending on whether the display module 151 is in an inactive state, whether execution is requested or an amount of data transmission required by an application or program requested to be executed or currently being executed is above a threshold value, or whether a preset application or program is being executed in the electronic device 100, but the AP 280 may, of course, generate the ENDC ON signal or the ENDC OFF signal based on a combination of operating states of the electronic device 100.

Figure 5:
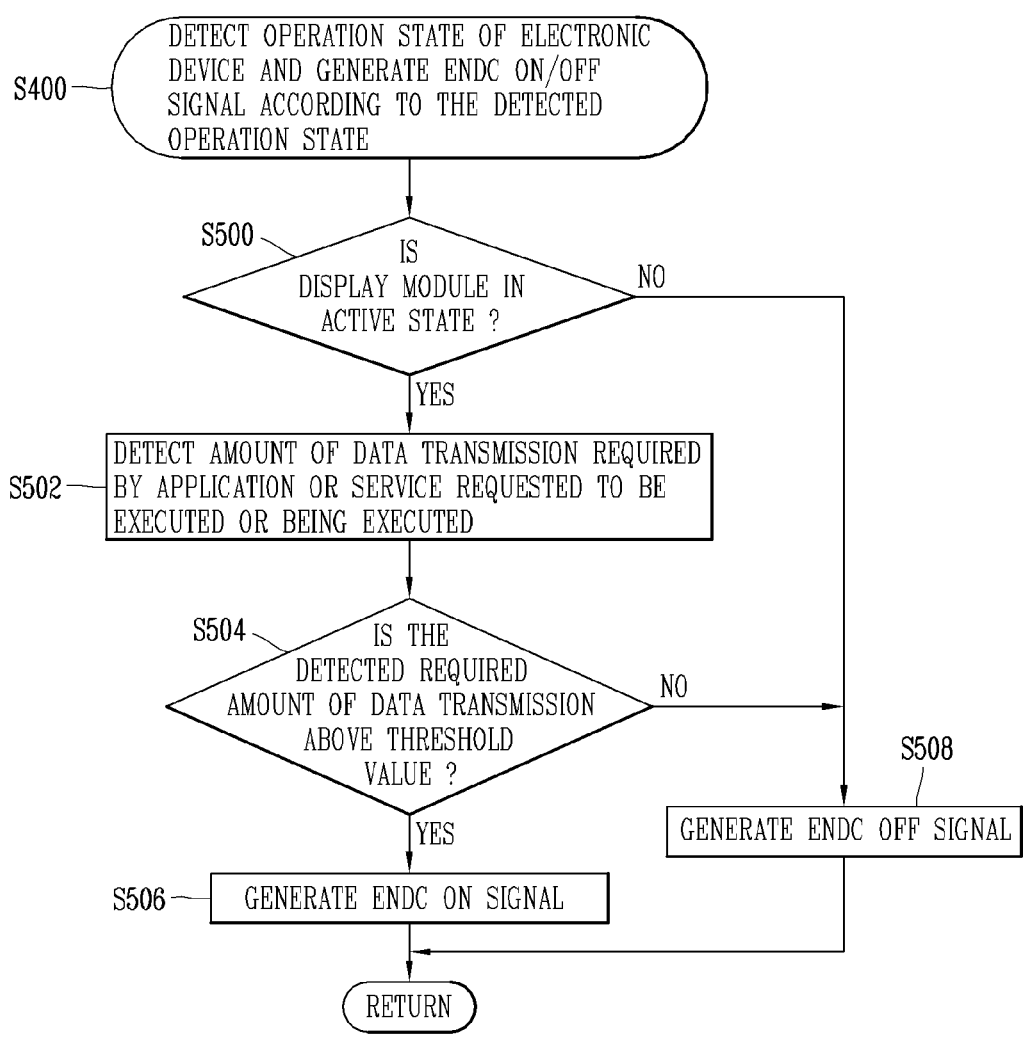
FIGS. 5 and 6 are flowcharts illustrating an operation process of generating a signal for controlling the dual connectivity based on an operating state of an electronic device in the electronic device associated with the present disclosure.
Figure 6:
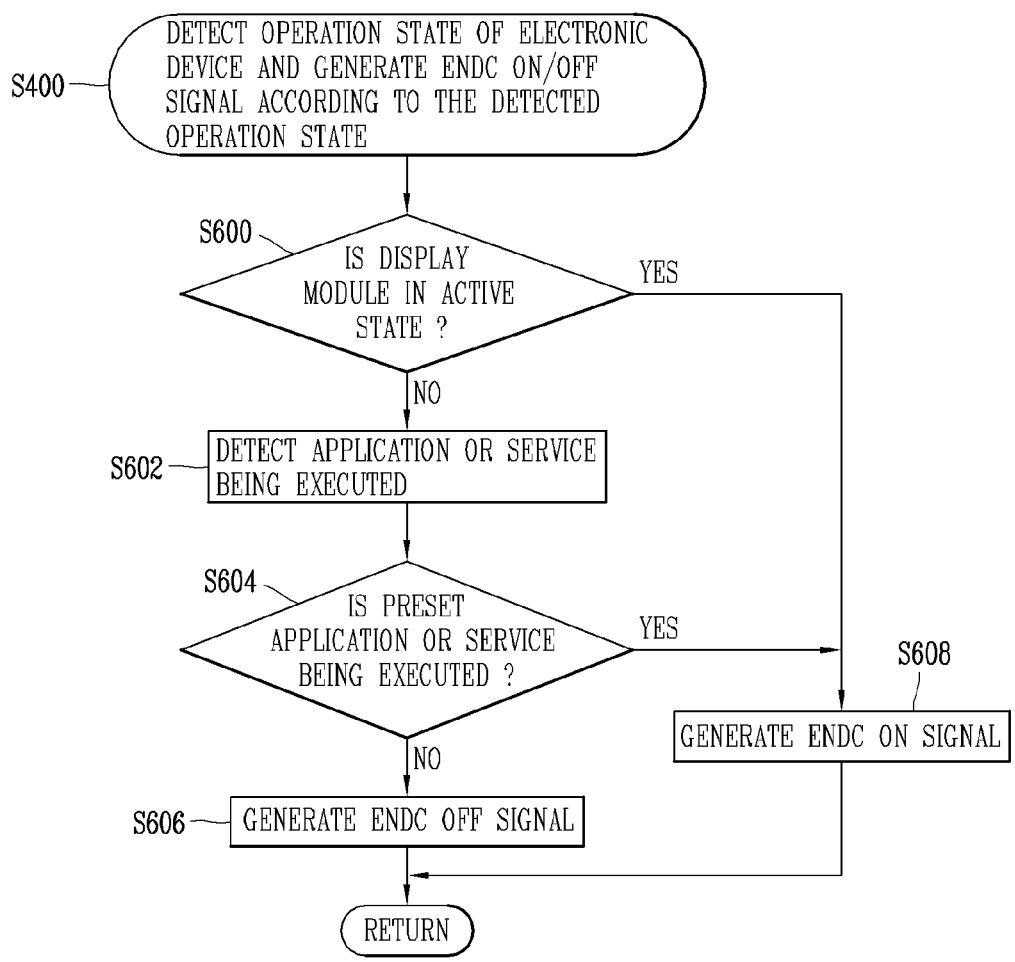

FIGS. 5 and 6 are flowcharts illustrating in more detail an operation process in which the AP 280 generates different ENDC control signals based on the operation state of the electronic device in the electronic device 100 related to the present disclosure in this case.

First, referring to FIG. 5, the AP 280 may first determine whether the display module 151 of the electronic device 100 is in an active state (S500). In other words, when at least part of the display module 151 is activated according to a user input or an event occurring in the electronic device 100, the AP 280 may determine that the display module 151 is activated.

On the other hand, when it is possible to activate only part of the display module 151, the AP 280 may determine whether to activate the display module 151 based on the activated area of the display module 151. In other words, when the activated area of the display module 151 is above a predetermined size, the AP 280 may determine that the display module 151 is activated.

As a result of the determination in step S500, when it is determined that the display module 151 is not activated, that is, in an inactive state, the AP 280 may determine that the currently detected operation state of the electronic device 100 does not satisfy a preset condition for activating the ENDC function. Accordingly, the AP 280 may generate an ENDC OFF signal (S508). Furthermore, the generated ENDC OFF signal may be transmitted to the modem 270.

On the contrary, when it is determined that the display module 151 is in an active state as a result of the determination in step S500, the AP 280 may detect an amount of data transmission required by an application or program (hereinafter, referred to as an application) or service that is requested to be executed or is currently being executed according to the currently detected operation state (S502).

Here, the required amount of data transmission may have a predetermined value. Alternatively, the required amount of data transmission may be calculated according to the user's electronic device usage history. For an example, when a user executes a specific application or service, the controller of the electronic device 100 may calculate an average amount of data transmission based on an amount of data transmitted according to the executed application or service. In addition, the calculated average amount of data transmission may be detected as the required amount of data transmission.

Meanwhile, when the required amount of data transmission is detected in step S502, the AP 280 may compare the detected required amount of data transmission with a preset threshold value (S504). Furthermore, when the detected required amount of data transmission is above a preset threshold value, the AP 280 may determine that the currently detected operation state of the electronic device 100 satisfies a preset condition for activating the ENDC function, and generate the ENDC ON signal (S506). In addition, the generated ENDC ON signal may be transmitted to the modem 270.

On the contrary, as a result of the comparison in step S504, when the detected required amount of data transmission is below a preset threshold value, the AP 280 may determine that the currently detected operation state of the electronic device 100 does not satisfy a preset condition for activating the ENDC function. In this case, the AP 280 may proceed to step S508 to generate an ENDC OFF signal, and may transmit the generated ENDC OFF signal to the modem 270.

Meanwhile, the required amount of data transmission detected in the step S502 may be a value obtained by summing required amounts of data transmission calculated for each application and service currently being executed in the electronic device 100. In this case, the step S504 may be a process of comparing the summed required amount of data transmission with the threshold value.

Accordingly, even when the display module 151 of the electronic device 100 is activated by a user input, the electronic device 100 according to an embodiment of the present disclosure may be connected only to a 4G network based on an application requested to be executed or being executed or the like. Therefore, in the case of simple text data transmission such as SNS, even when the display module 151 is activated for text input, an SNS service may be provided through a 4G network without activating the ENDC function. Accordingly, it may be possible to prevent unnecessary power consumption due to dual connectivity between a 4G network and a 5G network.

Meanwhile, in the description of FIG. 5, it is described a configuration in which whether to activate the ENDC function is determined according to an application requested to be executed or being executed when the display module 151 is activated as a result of detecting a changed operation state of the electronic device 100, but on the contrary, it may be, of course, possible to determine whether to activate the ENDC function even when the display module 151 is in an inactive state.

FIG. 6 is a flowchart illustrating an operation process of generating an ENDC ON or OFF signal according to a result of detecting an operation state of the electronic device 100 by the AP 280 in this case.

Referring to FIG. 6, first, the AP 280 may determine whether the display module 151 of the electronic device 100 is in an active state (S600). Furthermore, when the display module 151 is in an active state, the AP 280 may determine that the currently detected operation state of the electronic device 100 satisfies a preset condition for activating the ENDC function. Accordingly, the AP 280 may generate an ENDC ON signal (S608) and transmit the generated ENDC ON signal to the modem 270.

On the contrary, as a result of the determination in step S600, when the display module 151 is in an inactive state, the AP 280 may detect an application or service currently being executed in the electronic device 100 (S602). In addition, based on the detected application or service, the AP 280 may determine whether at least one of the preset applications or services is currently being executed in the electronic device 100 (S604).

Here, the preset applications or services are applications or services that are preset to transmit data in a 5G wireless communication scheme through an ENDC function. For an example, an application or service related to tethering to enable the Internet by connecting to an external device, uploading or downloading a large amount of data, and the like may be preset to transmit data through the 5G wireless communication scheme. These applications or services may be specified in advance by the user.

As a result of the determination in step S604, when at least one of preset applications or services is currently being executed on the electronic device 100, the AP 280 may determine that the currently detected operation state of the electronic device 100 satisfies a preset condition for activating the ENDC function. Accordingly, the AP 280 may proceed to step S608 to generate an ENDC ON signal and transmit the generated ENDC ON signal to the modem 270.

On the other hand, as a result of the determination in step S604, when at least one of preset applications or services is not currently being executed in the electronic device 100, the AP 280 may determine that the currently detected operation state of the electronic device 100 does not satisfy a preset condition for activating the ENDC function. Accordingly, the AP 280 may generate an ENDC OFF signal (S606) and transmit the generated ENDC OFF signal to the modem 270.

For an example, while a call function is being performed through a Voice Over LTE (VoLTE) function, the display module 151 may be in an inactive state. Accordingly, the AP 280 may proceed from the step S600 to step S602 to detect an application currently being executed.

Meanwhile, in the case of a VoLTE (Voice Over LTE) function, a large amount of data transmission is not required, it may not be an application preset to transmit data through the 5G wireless communication scheme. Therefore, the AP 280 may determine that a preset condition for activating the ENDC function is not satisfied in step S604, and thus proceed to step S606 to generate an ENDC OFF signal.

However, when the user ends the VoLTE call, the display module 151 may be changed to an active state to indicate the end of the call to the user. Then, the AP 280 may determine that an operation state change of the electronic device 100 has occurred (an event has occurred), and proceed to step S608 according to the determination result of step S600 to generate an ENDC ON signal. In addition, the generated ENDC ON signal may be transmitted to the modem 270.

Meanwhile, while downloading of a large amount of data is being performed, the display module 151 may be deactivated according to the passage of time. Accordingly, when the display module 151 is deactivated (a change of the operation state), the AP 280 may proceed from the step S600 to step S602 to detect an application currently being executed, or the like.

On the other hand, in the case of an application that downloads a large amount of data, it may be a preset application that transmits data through the 5G wireless communication scheme. Accordingly, the AP 280 may determine that a preset condition for activating the ENDC function is satisfied in step S604, and as a result, proceed to step S608 to generate an ENDC ON signal.

In addition, when the downloading of a large amount of data is completed, the large amount of data download application may be ended. Then, the AP 280 may determine that an event has occurred according to the termination of the application. Then, the AP 280 may determine the active state of the display module 151 according to the determination result in step S600.

Meanwhile, when there is no user input even though an application being executed is ended, the display module 151 may not be changed to an active state. In this case, the AP 280 may proceed to step S602 according to the determination result of step S600, and may detect the application currently being executed or the like.

In this case, as the large amount of data download application is ended, the application detected in step S602 may not include an application preset to transmit data through the 5G wireless communication scheme. Then, the AP 280 may determine that a condition for activating the ENDC function is not satisfied, and as a result, proceed to step S606 to generate an ENDC OFF signal.

Accordingly, when downloading of a large amount of data is being performed, the electronic device 100 according to an embodiment of the present disclosure may be dually connected to a 4G network and a 5G network through the ENDC function to perform high-speed and stable data transmission. On the contrary, when downloading of a large amount of data is ended, the electronic deice 100 may be connected only to a 4G network through the deactivation of the ENDC function, thereby preventing power consumption due to dual connectivity between the 4G network and the 5G network.

FIG. 7 is an exemplary view illustrating an example in which an electronic device associated with the present disclosure is switched from a state of being dually connected to a 4G network and a 5G network to a state of being connected only to a 4G network.

First, referring to (a) in FIG. 7, (a) in FIG. 7 shows an example in which the electronic device 100 is connected to both the 5G base station 700 and the 4G base station 710 as the ENDC function is activated.

For example, when a preset application is being executed, such as when a large data download application is executed in FIG. 6, or when a required amount of data transmission of an application requested to be executed by a user input is above a preset threshold value, and furthermore, although not shown, when a preset condition is satisfied, such as when the display module 151 of the electronic device 100 is activated, the electronic device 100 according to the embodiment of the present disclosure may activate the ENDC function.

Accordingly, as shown in (a) of FIG. 7, the electronic device 100 may perform wireless communication with both the 4G base station and the 5G base station. In this case, wireless communication with the 4G base station may be performed through the modem 270 integrated with the 4G wireless communication module 111 while at the same time performing wireless communication with the 5G base station through the activated 5G wireless communication module 112.

On the contrary, when any one of preset applications (preset applications using the 5G wireless communication scheme) is not executed, or when an amount of data transmission of an application requested to be executed is below a preset threshold value, and furthermore, when a preset condition is not satisfied, such as when the display module 151 of the electronic device 100 is deactivated, the electronic device 100 according to the embodiment of the present disclosure may deactivate the ENDC function.

In this case, the 5G wireless communication module 112 may be driven in a low power mode, and the search for a 5G base station may be stopped. Therefore, as connection to the 5G base station is not made, the electronic device 100 may be connected only to the 4G base station through the modem 270 integrated with the 4G wireless communication module 111 as shown in (b) in FIG. 7. Therefore, it may be possible to prevent power consumption due to dual connectivity between a 4G network and a 5G network.

On the other hand, the following [Table 1] shows a result of comparison test between a typical electronic device and an electronic device according to an embodiment of the present disclosure. The following [Table 1] shows an amount of power consumption after 14 hours in a standby state in a case where a control method according to an embodiment of the present disclosure is applied (B) and in a case where the method is not applied (A) in the same type of electronic devices.

TABLE 1

| | A | B | Remark |
|---|---|---|---|
| Decreased amount of SOC | 5.1 (97.2 -> 92.1) | 2.7 (97.2 -> 94.5) | Decreased by 47.1% |
| Modem wake-up (number of times) | 107 | 201 | |
| 5G connection (number of times) | 88 | 0 | |

It can be seen that an amount of state of charge (SOC) was decreased by 2.7%, whereas that of the electronic device (A) to which the present disclosure is not applied was decreased by 5.1%. In other words, in the case of the electronic device (B) to which the present disclosure is applied, it can be seen that the amount of SOC was decreased by 47.1% due to a decrease in standby power. In addition, looking at the number of times the modem was connected to the 4G or 5G base station during the same period of time (the number of modem wake-ups), the electronic device (A) to which the present disclosure is not applied was connected 107 times, of which the number of connections to the 5G base station (5G connections) was 88 times, while the electronic device (B) to which the present disclosure is applied was never connected to the 5G base station even though the modem was connected to the base station 201 times.

In other words, when a preset condition is not satisfied, such as when the display module is maintained in an inactive state as the electronic device is in a standby state, the electronic device according to an embodiment of the present disclosure does not perform search for 5G base stations and connection to a 5G network accordingly, and thus it can be seen that power consumption due to dual connectivity (ENDC) may be prevented.

Meanwhile, the electronic device 100 according to an embodiment of the present disclosure may maintain an inactive state of the 5G wireless communication module 112 regardless of an ENDC control signal when the 5G wireless communication module 112 is deactivated according to a specific circumstance.

For an example, in the case of a thermal mitigation state in which the 5G wireless communication module 112 is deactivated due to an increase in temperature, the modem 270 may maintain the 5G wireless communication module 112 in an inactive state even when the ENDC control signal transmitted from the AP 280 is an ENDC ON signal. In this case, the electronic device 100 may be connected only to a 4G base station regardless of the ENDC control signal.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 or the AP 280 of the terminal. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. An electronic device, comprising:
a first transmitter and receiver configured to perform control and signal processing for transmission and reception of signals with a 4G base station through a 4G network;
a second transmitter and receiver configured to perform control and signal processing for transmission and reception of signals with a 5G base station through a 5G network;
an application processor (AP) configured to detect a change of an operation state of the electronic device; and
a modem configured to activate only the first transmitter and receiver to perform wireless communication with the 4G base station or further activate the second transmitter and receiver to perform wireless communication with both the 4G base station and the 5G base station, according to the operation state of the electronic device detected by the AP
wherein,
the AP is further configured to determine a required amount of data transmission required by at least one application or service being executed at the electronic device; and
the modem is further configured to activate only the first transmitter and receiver or activate both the first transmitter and receiver and the second transmitter and receiver based on whether the required amount of data transmission is above a preset threshold amount of data transmission.

2. The electronic device of claim 1, wherein the modem is integrally formed with the first transmitter and receiver to maintain the first transmitter and receiver in an active state, and activate or deactivate the second transmitter and receiver according to the operation state of the electronic device detected by the AP.

3. The electronic device of claim 2, wherein the second transmitter and receiver is operated in a low power mode when deactivated, and wherein the second transmitter and receiver does not perform searching of 5G base stations the low power mode.

4. The electronic device of claim 1, wherein:
the AP is further configured to determine whether the operation state of the electronic device is changed according to an active state of a display module provided in the electronic device; and
the modem is further configured to activate only the first transmitter and receiver when the display module is in an inactive state and activate both the first transmitter and receiver and the second transmitter and receiver when the display module is in an active state.

5. The electronic device of claim 1, wherein:
the AP is further configured to detect an application or service being executed at the electronic device when detecting the operation state of the electronic device; and
the modem is further configured to activate only the first transmitter and receiver or activate both the first transmitter and receiver and the second transmitter and receiver based on whether a preset application or service is being executed.

6. The electronic device of claim 1, wherein the required amount of data transmission is an average amount of data transmission based on a usage history for each application or service being executed at the electronic device.

7. The electronic device of claim 1, wherein the AP is further configured to:
generate a first control signal activating only the first transmitter and receiver or a second control signal activating both the first transmitter and receiver and the second transmitter and receiver according to the operation state of the electronic device; and
transmit the generated first control signal or second control signal to the modem,
wherein the modem is further configured to deactivate or activate the second transmitter and receiver, to perform wireless communication only with the 4G base station or perform wireless communication with both the 4G base station and the 5G base station according to the control signal received from the AP.

8. The electronic device of claim 7, wherein:
the first control signal is generated when the display module of the electronic device is in an inactive state; and
the first control signal or the second control signal is generated when the display module of the electronic device is in an active state, based on a comparison between an amount of data transmission required by at least an application or service being executed at the electronic device and a preset threshold amount of data transmission.

9. The electronic device of claim 7, wherein:
the second control signal is generated when the display module of the electronic device is in an active state; and
the first control signal or the second control signal is generated based on whether a preset application or service is being executed at the electronic device when the display module of the electronic device is in an inactive state.

10. The electronic device of claim 1, the modem is further configured to:
detect whether the second transmitter and receiver is in an idle state when only the first transmitter and receiver is activated according to the operation state of the electronic device;
wherein an operation state of the second transmitter and receiver is maintained until it is switched to an idle state; and
deactivate the second transmitter and receiver according to the operation state of the electronic device when the second transmitter and receiver is in the idle state.

11. The electronic device of claim 7, the modem is further configured to deactivate the second transmitter and receiver according to the operation state of the electronic device when a remaining battery level of the electronic device is below a preset level.

12. A method of controlling an electronic device according to claim 1, the method comprising:
detecting an operation state of the electronic device by the AP;
determining whether the detected operation state satisfies a preset condition by the modem; and
based on the determination, activating a first transmitter and receiver to perform wireless communication with a 4G base station through a first transmitter and receiver through a 4G network or activating both the first transmitter and receiver and a second transmitter and receiver to perform wireless communication with both the 4G network and a 5G network, by the modem,
wherein the preset condition corresponds to whether a display module of the electronic device is activated, whether a preset application or service is being executed at the electronic device, or whether an amount of data transmission required by an application or service being executed at the electronic device is above a preset threshold amount of data transmission.

13. The method of claim 12, wherein detecting the operation state of the electronic device by the AP includes detecting when the operation state of the electronic device is changed, and
wherein a change in the operation state of the electronic device corresponds to a change in the operation state of the display module of the electronic device, ending execution of an application or service at the electronic device, or execution of a new application or service at the electronic device.

* * * * *